United States Patent
DeYoung et al.

(10) Patent No.: US 11,498,251 B2
(45) Date of Patent: Nov. 15, 2022

(54) METHOD OF PRODUCING MULTIPLE INSERT MOLDED PARTS

(71) Applicant: Innotec, Corp., Zeeland, MI (US)

(72) Inventors: Jonathan R. DeYoung, Grand Rapids, MI (US); Thomas J. Veenstra, Lakewood, CO (US); Jason S. Elzinga, Hudsonville, MI (US)

(73) Assignee: Innotec, Corp., Zeeland, MI (US)

( * ) Notice: Subject to any disclaimer, the term of this patent is extended or adjusted under 35 U.S.C. 154(b) by 264 days.

(21) Appl. No.: 16/757,792

(22) PCT Filed: Oct. 17, 2018

(86) PCT No.: PCT/US2018/056244
§ 371 (c)(1),
(2) Date: Apr. 21, 2020

(87) PCT Pub. No.: WO2019/083787
PCT Pub. Date: May 2, 2019

(65) Prior Publication Data
US 2021/0237321 A1    Aug. 5, 2021

Related U.S. Application Data

(60) Provisional application No. 62/576,412, filed on Oct. 24, 2017.

(51) Int. Cl.
*B29C 45/14*    (2006.01)
(52) U.S. Cl.
CPC .. *B29C 45/14344* (2013.01); *B29C 45/14467* (2013.01)

(58) Field of Classification Search
None
See application file for complete search history.

(56) References Cited

U.S. PATENT DOCUMENTS 2,892,013 A * 6/1959 Gomberg ............. H01B 17/306
264/261
4,732,724 A * 3/1988 Sterner ................... B29C 45/27
264/328.8

(Continued)

FOREIGN PATENT DOCUMENTS

EP    1343956 B1    10/2009
WO    2004103679 A1    12/2004

OTHER PUBLICATIONS

International Search Report and Written Opinion from PCT/US2018/056244 dated Dec. 21, 2018.

(Continued)

*Primary Examiner* — Edmund H Lee
(74) *Attorney, Agent, or Firm* — Warner Norcross + Judd LLP

(57) ABSTRACT

A method of injection molding uses different mold inserts, such as lead frames, to selectively control material flow in order to produce different parts in a common mold. One mold insert can have a different geometry than another mold insert so that molten material is either blocked or allowed to flow through corresponding portions of the mold inserts. By changing out the insert used for injection molding, insert-molded plastic parts produced in the mold can differ by at least one part feature.

17 Claims, 3 Drawing Sheets

(56) References Cited

U.S. PATENT DOCUMENTS

| | | | |
|---|---|---|---|
| 5,376,325 A * | 12/1994 | Ormson | B29C 45/1671 |
| | | | 264/254 |
| 5,387,472 A | 2/1995 | Shimmell | |
| 6,183,681 B1 * | 2/2001 | Sullivan | B29C 45/14065 |
| | | | 264/254 |
| 6,264,869 B1 * | 7/2001 | Notarpietro | B44C 3/046 |
| | | | 264/273 |
| 6,511,232 B1 | 1/2003 | Ishii et al. | |
| 7,947,208 B2 * | 5/2011 | Kimura | B29C 45/2703 |
| | | | 264/254 |
| 11,198,237 B2 * | 12/2021 | Kikumori | B29C 45/14311 |
| 2004/0164453 A1 * | 8/2004 | Warburton-Pitt | F16L 47/02 |
| | | | 264/261 |
| 2008/0062711 A1 | 3/2008 | Veenstra et al. | |
| 2009/0212461 A1 | 8/2009 | Lin | |
| 2012/0235286 A1 | 9/2012 | James | |

OTHER PUBLICATIONS

Ejection. IB Steiner, 2018, www.exjection.com. Accessed Oct. 2, 2018.

Shuttle Injection Molding. Davies Molding, 2018, www.daviesmolding.com. Accessed Oct. 2, 2018.

\* cited by examiner

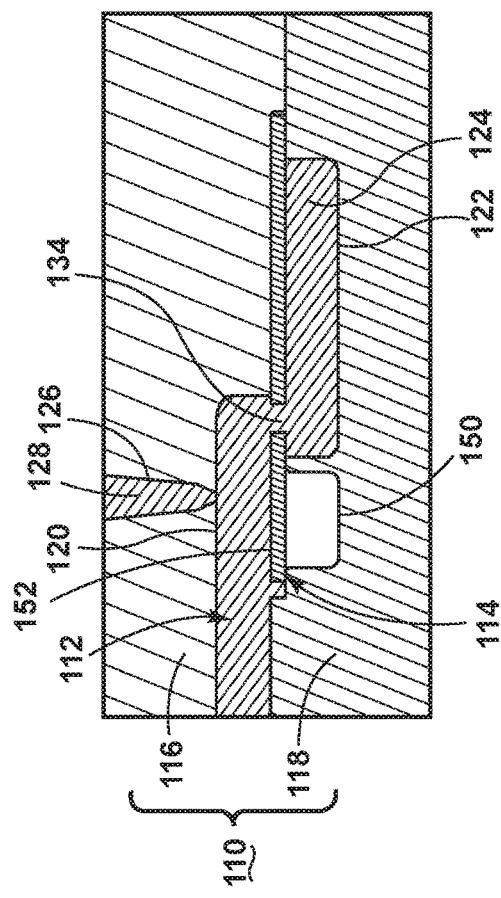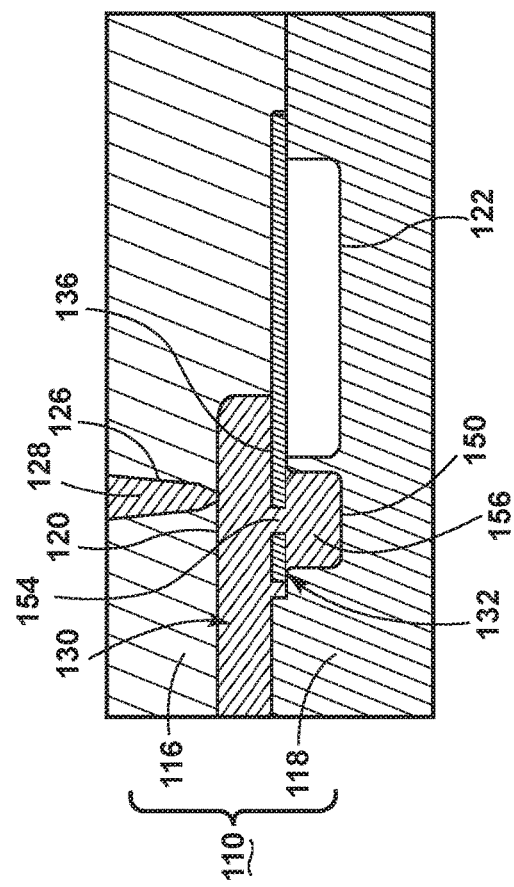

METHOD OF PRODUCING MULTIPLE INSERT MOLDED PARTS

BACKGROUND OF THE INVENTION

The present invention relates to plastic injection molding.

Plastic injection molding produces parts by injecting molten plastic material into a mold. Parts that are even slightly different require separate molds, or a high-complexity mold with mechanisms to shuttle tools into the mold to form the differing features. One method, referred to as shuttle injection molding, requires two bottom mold halves for one top mold half. While the first bottom mold half is in use, the second bottom mold half can be loaded with inserts. When the press opens, the first bottom mold half shuttles out to eject the part and be reloaded with inserts, while the second bottom mold half shuttles into its place. While this method reduces press time, it requires an expensive second mold half. Another approach using rotational movement called Exjection® combines extrusion and injection molding to manufacture parts with long profiles.

SUMMARY OF THE INVENTION

The present invention provides injection-molded parts and methods for producing such parts using mold inserts, such as lead frames, to selectively control material flow during an injection molding process in order to produce different parts in a common mold.

More particularly, in one embodiment, a method of producing multiple insert molded parts using a common mold is provided. The method includes setting a first insert into a mold comprising a mold cavity having at least one cavity feature, injecting a plastic material into the mold cavity and at least partially encapsulating the first insert to form a first part with at least one part feature corresponding to the at least one cavity feature, removing the first part from the mold, setting a second insert into the mold, and injecting a plastic material into the mold cavity and at least partially encapsulating the second insert to form a second part. The second insert blocks flow of the plastic material to the at least one cavity feature, such that the second part lacks the at least one part feature corresponding to the at least one cavity feature.

These and other advantages and features of the invention will be more fully understood and appreciated by reference to the description of the current embodiments and the drawings.

BRIEF DESCRIPTION OF THE DRAWINGS

FIG. 6 is an enlarged cross-sectional view of a portion of a mold and an insert for producing a first part according to an embodiment of the present invention; and FIG. 7 is an enlarged cross-sectional view of a portion of the mold of FIG. 6 and another insert for producing a second part according to an embodiment of the present invention.

DESCRIPTION OF THE CURRENT EMBODIMENTS

The present invention uses mold inserts, such as lead frames, to selectively control material flow during an injection molding process. Similar parts, which differ only by features within the part, can then be injection molded without requiring sections of a mold tool to shuttle into place.

In one embodiment, by changing the geometry, such as a hole pattern, of the mold insert, molten material can be either blocked or allowed to flow through to one or more selected features. This method provides the ability to produce parts with different configurations and many combinations of features using one mold, for example by "turning on" and "turning off" one or more part features. By changing the geometry of the mold insert used, increased product flexibility is provided for a single mold tool set.

Figure 1:
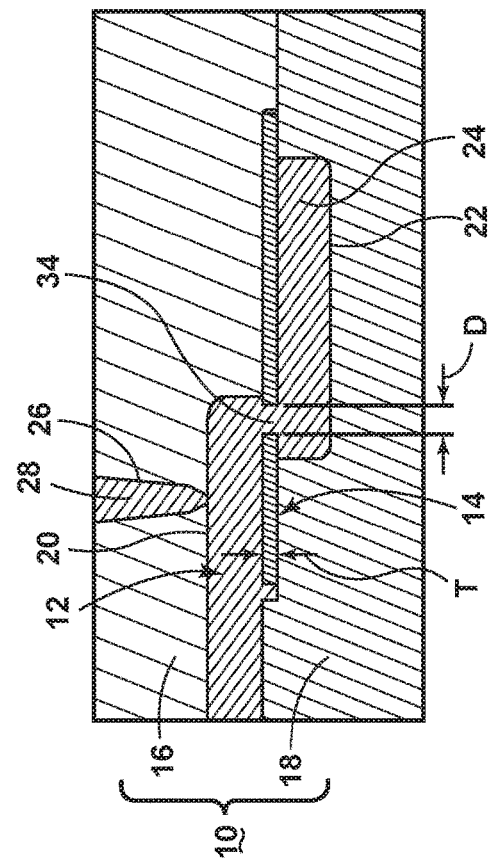
FIG. 1 is an enlarged cross-sectional view of a portion of a mold and an insert for producing a first part according to an embodiment of the present invention.

FIG. 1 shows a mold 10 for the production of a first insert-molded plastic part 12 having a first insert 14. The mold 10 shown herein includes two mold halves disposed opposite each other, including a first mold half 16 and a second mold half 18. The mold halves 16, 18 mate together and enclose an inner space defining a mold cavity 20 forming the features of the first part 12. The mold 10 can be made from metal, such as steel or aluminum, and machined to define the mold cavity 20 forming the features of the first part 12.

In one embodiment, the first mold half 16 can form a cavity side of the mold 10 and the second mold half 18 can form a core side of the mold 10. A top or cover plate (not shown) can clamp the first mold half 16 to a moving half of a molding machine. A bottom or ejector plate (not shown) can clamp the second mold half 18 to a stationary or fixed half of the molding machine.

The mold cavity 20 can have at least one cavity feature 22 corresponding to a part feature 24 of the first part 12. The cavity feature 22 can be formed in either mold half 16, 18, and is shown in FIGS. 1-2 as formed in the second mold half 18.

A gate 26 is provided in the mold 10 through which molten plastic material 28 enters the mold cavity 20. The gate 26 can be formed in either mold half 16, 18, and is shown herein formed in the first mold half 16. Molten plastic material 28 is injected into the mold cavity 20 through the gate 26 and around the first insert 14 to either partially or completely encapsulate the first insert 14 to form a complete assembly, i.e. first part 12.

Figure 2:
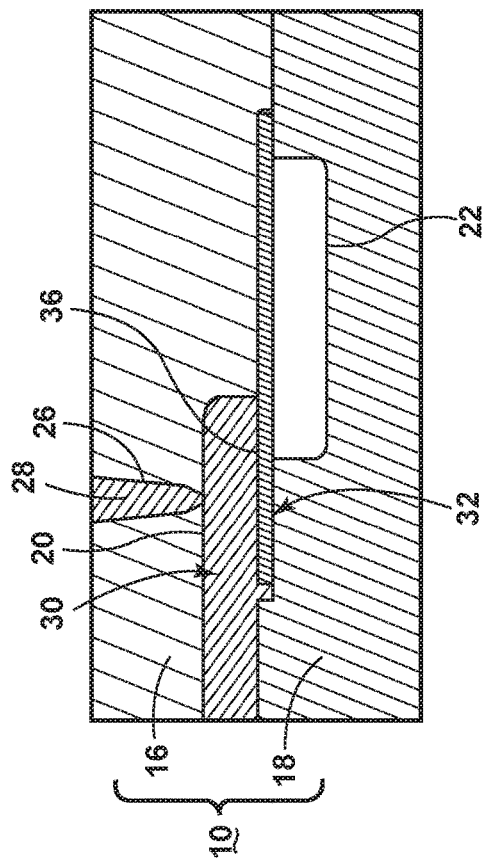
FIG. 2 is an enlarged cross-sectional view of a portion of the mold of FIG. 1 and another insert for producing a second part according to an embodiment of the present invention.

Referring to FIG. 2, a second insert-molded plastic part 30 can be produced in the same mold 10 using a second insert 32. Using the second insert 32, the mold halves 16, 18 can be used to form the second part 30, which is different than the first part 12 by at least one part feature 24. The second insert 32 controls plastic flow within the mold cavity 20 to block flow to at least one cavity feature 22 in order to "turn off" the part feature 24. In the illustrated embodiment, the second part 30 is the same as the first part 12 save for part feature 24, i.e. the second part 30 is the first part 12 minus the part feature 24.

The mold inserts 14, 32 selectively control plastic flow during an injection molding process to create different form factors with the mold 10. Similar parts, which differ only by features within the part, can be injection molded without requiring sections of the mold 10 to be shuttled into place. By changing a hole pattern in the insert 14, 32 used, plastic can be either blocked or allowed to flow through to the selected features of the mold cavity 20. Features can change with each mold cycle simply by changing out the insert 14, 32.

In the embodiments of FIGS. 1-2, the first mold insert 14 includes at least one through hole 34 in register with the at least one cavity feature 22. Molten plastic material 28 injected into the mold cavity 20 passes through the at least one through hole 34 to fill the at least one cavity feature 22, thereby producing the first part 12 with the part feature 24. The second mold insert 32 lacks a through hole in register with the at least one cavity feature 22, and instead includes a blocker 36, such as a solid wall, between the gate 26 and the at least one cavity feature 22. Molten plastic material 28 injected into the mold cavity 20 is blocked by the second insert 32, and does not fill the at least one cavity feature 22, thereby producing the second part 30 without part feature 24.

The diameter D of the at least one through hole 34 can preferably be in the range of 50-200%, and more specifically in the range of 75-125%, of the thickness T of the insert 14. Larger diameters can cause deformation of the insert 14, while smaller diameters will not completely fill the cavity feature 22 to produce the part feature 24. The sizing and hole pattern in any of the inserts disclosed herein can be adjusted to allow proper flow for plastic materials with differing flow properties.

For both parts 12, 30, the insert 14, 32 is held between the mold halves 16, 18 within the mold cavity 20. As shown, a portion of the insert 14, 32 can be in direct contact with one or more of the mold halves 16, 18. Further, a portion of the insert 14, 32 can be out of contact with both mold halves 16, 18. While not shown herein, the insert 14, 32 can further be held in place within the mold cavity 20 with one or more pins.

The mold inserts 14, 32 can be machined or pre-molded components, and can be made from metal, such as steel or aluminum, or non-metal materials. In one example, the inserts 14, 32 can be produced by a stamping, blanking or etching process. However produced, the inserts 14, 32 can be formed to fit within the cavity 20 and control plastic flow within the cavity 20. While not shown in FIGS. 1-2, the inserts 14, 32 can incorporate electronic components, such as sensors or circuitry. As an alternative, an insert molded metal stock may be used to block or divert the flow of the plastic inside the cavity 20 of the mold 10.

In one embodiment, the inserts 14, 32, can be provided in the form of lead frames for semiconductor integrated circuits. Circuits (not shown) can be mounted on the lead frames 14, 32 prior to the molding process, and each circuit can thereafter be partially or completely encapsulated in plastic formed by the injection molding process.

With respect to FIGS. 1-2, the location of the gate 26 can be optimized for the first and second parts 12, 30. In order to use a common gate 26 for injection molding both parts 12, 30, moldflow analysis can be used to determine an optimal gate location that works for each part configuration.

Figure 3:
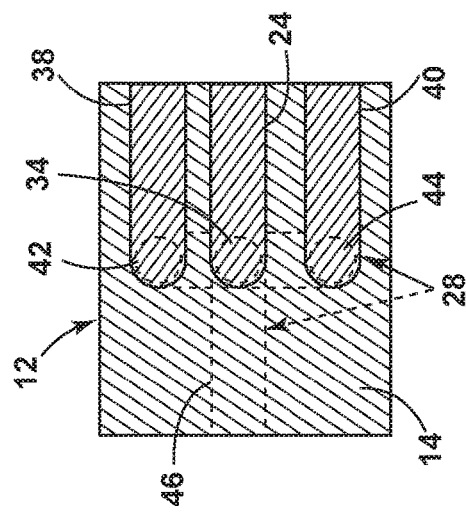
FIG. 3 is a top view of a portion of the first part from FIG. 1.
Figure 4:
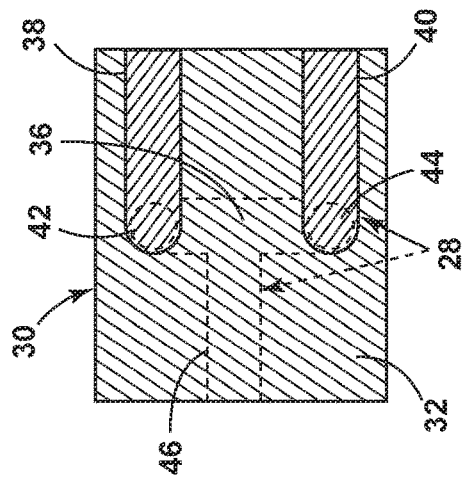
FIG. 4 is a top view of a portion of the second part from FIG. 2.

FIGS. 3 and 4 show a portion of the exemplary parts 12, 30. In FIG. 3, part 12 includes the insert 14 at least partially encapsulated by the plastic material 28. Part feature 24 is formed on a first side of the insert 14, along with two other part features 38, 40. These part features 38, 40 can be formed by corresponding cavity features (not shown) in the mold cavity 20. In addition to through hole 32, the insert 14 can include additional through holes 42, 44, indicated in phantom line, for part features 38, 40. Molten plastic material 28 injected into the mold cavity 20 passes through all through holes 34, 42, 44 to producing the first part 12 with the part features 24, 38, 40. One or more additional part features 46 are also formed on a second side of the insert 14, opposite the first side, as indicated in phantom line in FIG. 3. The part features 46 on the second side of the insert 14 can be formed by one or more corresponding cavity features in the mold cavity 20, specifically in the first mold half 16 for the illustrated embodiment.

In FIG. 4, part 30 includes the insert 32 at least partially encapsulated by the plastic material 28. Part feature 24 is excluded from the part 30 by the presence of the blocker 36 in the insert 32. In addition to blocker 36, the insert 32 can include through holes 42, 44, indicated in phantom line, for part features 38, 40. Molten plastic material 28 injected into the mold cavity 20 passes through the through holes 42, 44 to produce the second part 30 with the part features 38, 40 and without part feature 24.

In addition to the geometries shown herein, the inserts 14, 32 can comprise any pattern of holes 34, 42, 44 in order to add or exclude any combination or subcombination of part features 24, 38, 40 to a part produced in mold 10. The pattern of through holes in the inserts 14, 32 can vary by at least one through hole in order to produce different parts 12, 30 from the same mold 10. For example, the number and/or the location of through holes in the inserts 14, 32 can differ in order to produce different parts from the same mold 10.

It is noted that the mold 10, inserts 14, 28, and resulting parts 12, 30 are schematic illustrations. In practice, construction of the mold 10 and inserts 14, 28 depends on the shape of the parts 12, 30 to be produced, which can determine the size of cavity 20, the shape of cavity 20, the number of cavities 20 per mold, the parting line selection between mold halves 16, 18, runner and gate selection, and what ejection system is used to eject the molded parts 12, 30. Also, while a straight-pull mold consisting of two halves 16, 18 is shown, additional side-action or other inserts can be included for parts with more complex geometries.

Figure 5:
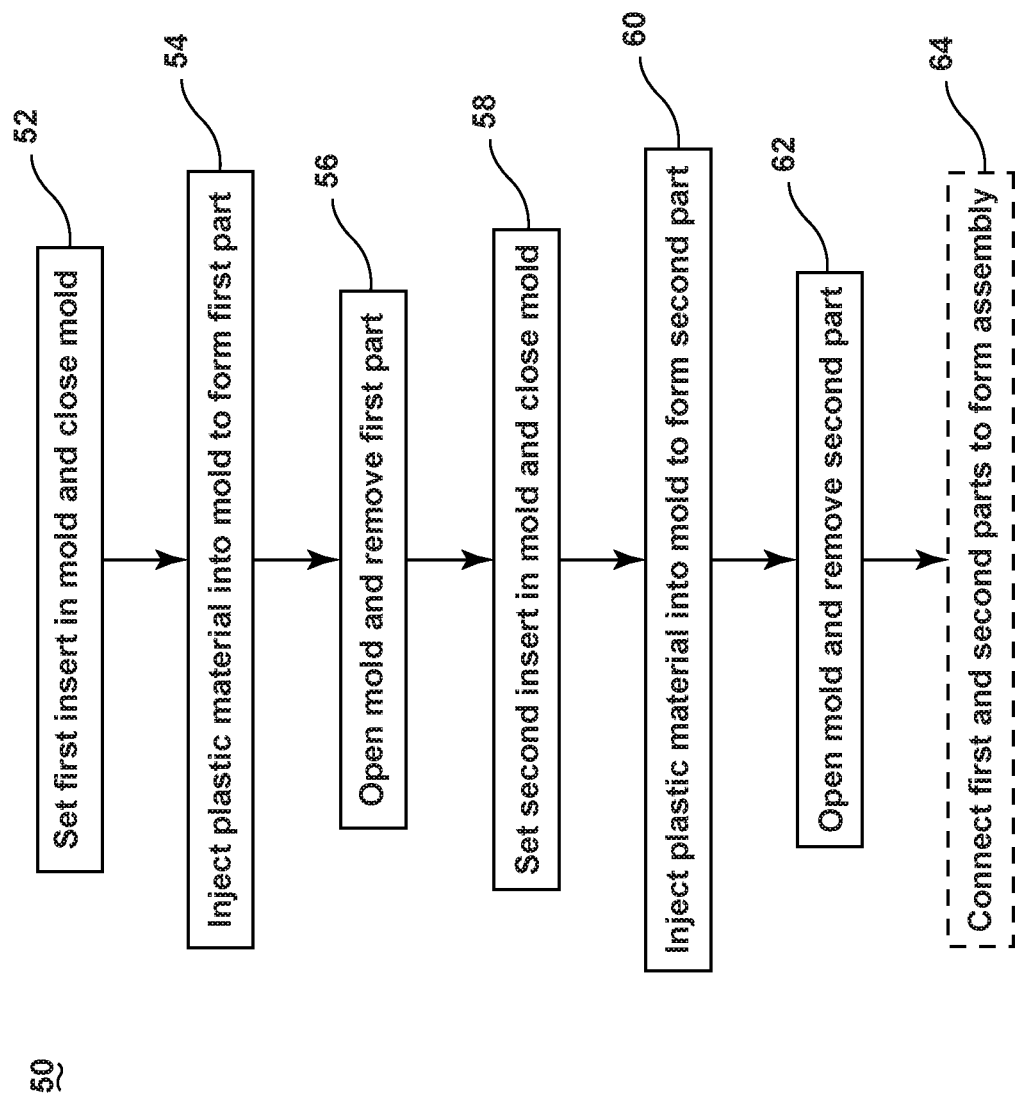
FIG. 5 is a diagram illustrating a method of producing multiple insert molded parts using a common mold according to an embodiment an embodiment of the present invention.

FIG. 5 is a diagram illustrating a method 50 of producing multiple insert molded parts using a mold. The sequence of steps discussed is for illustrative purposes only and is not meant to limit the method in any way as it is understood that the steps may proceed in a different logical order, additional or intervening steps may be included, or described steps may be divided into multiple steps, without detracting from the invention. For example, while the method 50 discusses production of the second part 30 after the first part 12, alternatively, the second part 20 can be produced before the first part 12. The method 50 is described with respect to the mold 10, inserts 14, 28, and resulting parts 12, 30 discussed for FIGS. 1-4, although it is understood that the method 50 is not limited to the particular embodiment of FIGS. 1-4.

To produce the first part 12, the first insert 14 is set within the mold 10 at step 52. To set the first insert 14, the mold halves 16, 18 are opened and the first insert 14 is set within the mold cavity 20 by a manual or automatic operation. After setting of the first insert 14 is complete, the mold halves 16, 18 can be closed and clamped. Clamping can comprise directly clamping the insert 14, which can be a lead frame in some embodiments, between the mold halves 16, 18.

Plastic material 28 is then injected into the mold cavity 20 and around the first insert 14 to either partially or completely encapsulate the first insert 14 to form a complete assembly, i.e. first part 12, at step 54. For plastic injection, granular or powered plastic material can be fed from a hopper to a heated chamber or barrel where it is mixed. The molten material is then injected, such as being forced by a ram or screw into the cavity 20 of the mold 10, where it cools and hardens.

During injection, the first insert 14 allows flow to the cavity feature 22 of the mold cavity 20 to form the part feature 24. In particular, plastic material 28 flows through the through hole 34 to fill the cavity feature 22.

After the plastic material 28 has cooled and hardened, the first part 12 is removed from the mold 10 by opening the mold halves 16, 18 at step 56. An ejection system can be used to eject the molded part 12 from the mold 10. It is noted that pressure can be maintained until the plastic material 28 has adequately hardened for removal from the mold 10.

Optionally, the first part 12 can be covered by a second shot to seal the insert 14. The second shot can be performed in the same mold 10 as part of step 54, or can be performed in a separate mold after step 56.

To produce the second part 30, the second insert 32 is set within the mold 10 while the mold halves 16, 18 are open, at step 58. Optionally, the second insert 32 is set while the mold 10 is still open following the removal of the first part 12. The setting of the second insert 32 can be performed by a manual or automatic operation. After setting of the second insert 32 is complete, the mold halves 16, 18 can be closed and clamped. Clamping can comprise directly clamping the insert 32, which can be a lead frame in some embodiments, between the mold halves 16, 18.

Plastic material 28 is then injected into the mold cavity 20 and around the second insert 32 to either partially or completely encapsulate the second insert 32 to form a complete assembly, i.e. second part 30, at step 60. During injection, the second insert 32 blocks flow to the cavity feature 22 of the mold cavity 20 to form the second part 30 without the part feature 24. In particular, plastic material 28 is precluded by the blocker 36 from entering the cavity feature 22.

After the plastic material 28 has cooled and hardened, the second part 30 is removed from the mold 10 by opening the mold halves 16, 18 at step 62. An ejection system can be used to eject the molded part 30 from the mold 10. It is noted that pressure can be maintained until the plastic material 28 has adequately hardened for removal from the mold 10.

Optionally, the second part 30 can be covered by a second shot to seal the insert 32. The second shot can be performed in the same mold 10 as part of step 60, or can be performed in a separate mold after 62.

In one embodiment of the method 50, the first and second insert-molded parts 12, 30 are connected together, or otherwise joined, to form an assembly at step 64. In one example, the part feature 24 present on the first part 12 but not on the second part 30 comprises a connector for connecting the first part 12 with the second part 30. It is noted that one or more finishing steps can be performed on the parts 12, 30 before the parts 12, 30 are assembled at step 64, and likewise that one or more finishing steps can be performed on the assembly after step 64.

In other embodiments, rather than simply adding or excluding a part feature, a mold insert can be configured to divert resin flow from one area of the mold cavity to another area, thereby simultaneously excluding a part feature and adding another part feature. For example, a mold insert can comprise a pattern of holes in order to add at least one part feature while exclude at least one other part feature from a part produced in a mold. An example of this is detailed with respect to FIGS. 6-7, where like elements are denoted by the same reference numerals for FIGS. 1-4 increased by 100.

FIG. 6 shows a mold 110 for the production of a first insert-molded plastic part 112 having a first insert 114. The mold 110 shown herein includes two mold halves disposed opposite each other, including a first mold half 116 and a second mold half 118. The mold halves 116, 118 mate together and enclose an inner space defining a mold cavity 120 forming the features of the first part 112. The mold cavity 120 can have at least one cavity feature 122 corresponding to a part feature 124 of the first part 112. The first mold insert 114 includes at least one through hole 134 in register with the at least one cavity feature 122 to produce the part 112 with the part feature 124.

The mold cavity 120 further includes at least one other cavity feature 150. The second cavity feature 150 can be formed in either mold half 116, 118, and is shown in FIGS. 5-6 as formed in the second mold half 118.

The first insert 114 lacks a through hole in register with the second cavity feature 150, and instead includes a blocker 152 between the gate 126 and second cavity feature 150. Molten plastic material 128 injected into the mold cavity 120 is precluded from entering the second cavity feature 150 by the blocker 152.

Referring to FIG. 7, a second insert-molded plastic part 130 can be produced in the same mold 110 using a second insert 132. The second mold insert 132 lacks a through hole in register with the first cavity feature 122, and instead includes a blocker 136 between the gate 126 and the first cavity feature 122. Molten plastic material 128 injected into the mold cavity 120 is precluded from entering the first cavity feature 122 by the blocker 136, thereby producing the second part 130 without the part feature 124.

The second mold insert 132 further includes a through hole 154 in register with the second cavity feature 150. Molten plastic material 128 injected into the mold cavity 120 passes through the through hole 154 to fill the second cavity feature 150, thereby producing the second part 130 with a corresponding part feature 156, which is not present on the first part 112.

With its pattern of blocker 136 and through hole 154, the second mold insert 132 diverts plastic material 128 from the first cavity feature 122 to the second cavity feature 150, thereby simultaneously excluding part feature 124 and adding part feature 156. The resulting insert-molded plastic part 130 differ by multiple part features, i.e. the second part 130 is the first part 12 minus the part feature 124 but with the addition of part feature 156.

There are several advantages of the present disclosure arising from the various features of the methods, apparatus, and systems described herein. For example, the embodiments of the invention described above use mold inserts as a tool feature for an injection molded part that has multiple part versions or configurations, such as having differing features and/or differing lengths. Conventionally, mold inserts are used to allow single parts to contain multiple materials.

Another advantage arising from the various features of the methods, apparatus, and systems described herein is that tooling complexity is reduced, as is cost for an injection molded part that has multiple versions with differing features. Typically, such a part would require multiple mold tools or a higher-complexity mold tool with mechanisms to shuttle tool steel into place to form the differing features.

The advantages of this concept include simplicity, lower cost, and ease of adaptability to other inline processes.

Simplicity and lower cost are the result of being able to avoid rotational or linear mechanisms in the mold tool. Adaptability to other inline processes is improved because the mold tooling can be more compact, providing more room for neighboring equipment.

The above description is that of current embodiments of the invention. Various alterations and changes can be made without departing from the spirit and broader aspects of the invention as defined in the appended claims, which are to be interpreted in accordance with the principles of patent law including the doctrine of equivalents.

This disclosure should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein.

The phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "front," "back," "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. A method of producing multiple insert molded parts, the method comprising:
   setting a first insert into a mold comprising a mold cavity having at least one cavity feature;
   injecting a plastic material into the mold cavity and at least partially encapsulating the first insert to form a first part with at least one part feature corresponding to the at least one cavity feature;
   removing the first part from the mold;
   setting a second insert into the mold; and
   injecting a plastic material into the mold cavity and at least partially encapsulating the second insert to form a second part, wherein the second insert blocks flow of the plastic material to the at least one cavity feature and the second part lacks the at least one part feature corresponding to the at least one cavity feature.

2. The method of claim 1, wherein setting the first insert into the mold comprises opening the mold an automatically setting the first insert into the mold cavity and setting the second insert into the mold comprises opening the mold an automatically setting the second insert into the mold cavity.

3. The method of claim 1, wherein the mold comprises first and second mold halves disposed opposite each other and configured to mate together and enclose an inner space defining the mold cavity.

4. The method of claim 1, wherein the first insert comprises a through hole in register with the at least one cavity feature after setting the first insert into the mold.

5. The method of claim 4, wherein the through hole has a diameter of 50-200% of the thickness of the first insert.

6. The method of claim 4, wherein the through hole has a diameter of 75-125% of the thickness of the first insert.

7. The method of claim 1, wherein the mold cavity comprises at least one other cavity feature, and the second part comprises at least one part feature corresponding to the at least one other cavity feature.

8. The method of claim 1, wherein the first insert blocks flow of the plastic material to the at least one other cavity feature and the first part lacks the at least one part feature corresponding to the at least one other cavity feature.

9. The method of claim 1, wherein the first insert comprises a first set of through holes and the second insert comprises a second set of through holes, wherein the first set of through holes differs from the second set of through holes by at least one through hole.

10. The method of claim 9, wherein the first set of through holes differs from the second set of through holes by at least one of the number and location of through holes.

11. The method of claim 1, wherein the first and second inserts comprise metal stampings.

12. The method of claim 1, wherein the first insert comprises a first lead frame for an integrated circuit, and the second insert comprises a second lead frame for an integrated circuit.

13. The method of claim 1, wherein the at least one part feature is a connector used to join the first and second parts.

14. A method of producing multiple insert molded parts, the method comprising:
   setting a first insert into a mold comprising a mold cavity having at least one cavity feature, wherein the first insert comprises a through hole in register with the at least one cavity feature after setting the first insert into the mold;
   injecting a plastic material into the mold cavity and at least partially encapsulating the first insert to form a first part with at least one part feature corresponding to the at least one cavity feature;
   removing the first part from the mold;
   setting a second insert into the mold, wherein the second insert lacks a through hole in register with the at least one cavity feature after setting the second insert into the mold; and injecting a plastic material into the mold cavity and at least partially encapsulating the second insert to form a second part, wherein the second insert blocks flow of the plastic material to the at least one cavity feature and the second part lacks the at least one part feature corresponding to the at least one cavity feature.

15. The method of claim 14, wherein the through hole has a diameter of 50-200% of the thickness of the first insert.

16. The method of claim 14, wherein the first insert comprises a first lead frame for an integrated circuit, and the second insert comprises a second lead frame for an integrated circuit.

17. The method of claim 16, wherein the at least one part feature is a connector used to join the first and second parts.

* * * * *

UNITED STATES PATENT AND TRADEMARK OFFICE
CERTIFICATE OF CORRECTION

PATENT NO. : 11,498,251 B2
APPLICATION NO. : 16/757792
DATED : November 15, 2022
INVENTOR(S) : Jonathan R. DeYoung et al.

Page 1 of 1

It is certified that error appears in the above-identified patent and that said Letters Patent is hereby corrected as shown below:

In the Claims

Column 8, Claim 2, Line 12:
"an" should be -- and --

Column 8, Claim 2, Line 14:
"an" should be -- and --

Signed and Sealed this
Seventh Day of February, 2023

Katherine Kelly Vidal
*Director of the United States Patent and Trademark Office*